United States Patent
Naumann et al.

(10) Patent No.: US 6,403,507 B2
(45) Date of Patent: Jun. 11, 2002

(54) LEAD-FREE BISMUTH-CONTAINING SILICATE GLASSES AND USES THEREOF

(75) Inventors: Karin Naumann, Ober-Olm; Magdalena Winkler-Trudewig, Mainz; Ute Woelfel, Mainz; Christian Kunert, Mainz, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/819,320

(22) Filed: Mar. 28, 2001

(30) Foreign Application Priority Data

Mar. 30, 2000 (DE) .......................... 100 15 900
Jun. 16, 2000 (DE) .......................... 100 29 820
Jun. 16, 2000 (DE) .......................... 100 29 818

(51) Int. Cl.$^7$ .................. C03C 3/062; C03C 3/087; C03C 3/095; H01J 29/06
(52) U.S. Cl. ................... 501/14; 501/21; 501/26; 501/64; 501/70; 501/72; 501/73; 313/480
(58) Field of Search ............... 501/14, 21, 26, 501/64, 70, 72, 73; 313/480

(56) References Cited

U.S. PATENT DOCUMENTS

| | | | | |
|---|---|---|---|---|
| 3,677,960 A | * | 7/1972 | Ishiyama et al. | |
| 3,728,646 A | | 4/1973 | Zijlstra | |
| 4,892,847 A | * | 1/1990 | Reinherz | 501/14 |
| 5,244,848 A | * | 9/1993 | Clifford et al. | 501/66 |
| 5,308,803 A | * | 5/1994 | Clifford et al. | 501/17 |
| 5,393,714 A | * | 2/1995 | Thometzek et al. | 501/29 |

FOREIGN PATENT DOCUMENTS

| | | |
|---|---|---|
| EP | 0 267 154 A1 | 5/1988 |
| JP | 7-206468 | 8/1995 |
| JP | 7-206471 | 8/1995 |
| JP | 09142873 A | 6/1997 |

OTHER PUBLICATIONS

Patent Abstracts of Japan vol. 1995, No. 11, Dec. 26, 1995 & JP 07 206568, Aug. 8, 1995.
Patent Abstracts of Japan vol. 1995, No. 11, Dec. 26, 1995 & JP 07 206471 A, Aug. 8, 1995.
Patent Abstracts of Japan vol. 1997, No. 10, Oct. 31, 1997 & JP 09 142873 A, Jun. 3, 1997.

* cited by examiner

*Primary Examiner*—David Sample
(74) *Attorney, Agent, or Firm*—Michael J. Striker

(57) ABSTRACT

The lead-free bismuth-containing silicate glasses, which are particularly suitable for use as funnel glass or neck glass for cathode ray tubes and as soldering glass, have the following respective compositions (in % by weight, based on oxide): $SiO_2$ 40–60; $Bi_2O_3$, 10–30; $ZrO_2$, 0–3; $Al_2O_3$, 0.5–5; MgO, 0–6; CaO, 0.5–5; SrO, 1–15; BaO, 0–15; sum of the alkaline earth metal oxides, 2–20; ZnO, 0–2; $Li_2O$, 0–10; $Na_2O$, 1–10; $K_2O$, 2–10; $Cs_2O$, 0–3, sum of the alkali metal oxides, 5–20; $CeO_2$, 0–8; $WO_3$, 0.5–5; $MoO_3$, 0–5 and $Sb_2O_3$, 0–0.6; and $SiO_2$ 30–50; $Bi_2O_3$, 20–40; $ZrO_2$, 0–3; $Al_2O_3$, 0.5–5; MgO, 0–4; CaO, 0.5–4; SrO, 1–15; BaO, 0–15; sum of the alkaline earth metal oxides, 2–20; ZnO, 0–2; $Li_2O$, 0–5; $Na_2O$, 1–12; $K_2O$, 2–15; $Cs_2O$, 0–3, sum of the alkali metal oxides, 5–20; $CeO_2$, 0–8; $WO_3$, 0.5–5; $MoO_3$, 0–5 and $Sb_2O_3$, 0–0.6.

17 Claims, No Drawings

LEAD-FREE BISMUTH-CONTAINING SILICATE GLASSES AND USES THEREOF

BACKGROUND OF THE INVENTION

1. Field of the Invention

The invention relates to lead-free bismuth-containing silicate glasses. The invention also relates to uses of these glasses.

2. Prior Art

Television tubes operating by the cathode-ray principle consist of the glass parts picture screen (panel), funnel and neck. These glass parts enclose an evacuated space. The neck is that part of the tube, which contains one or more electron-beam guns. The panel includes, inter alia, one or more luminescent substances. The funnel is the conical part of the tube.

To meet the different requirements, the three above-mentioned glass parts have different physical properties as a result of different compositions.

The requirements placed upon funnel glass include high X-ray absorption, high electrical resistance and satisfactory melting and processing properties. In contrast to the panel glass, discoloration as a result of the electron radiation does not present a problem here. As the wall thickness of the funnel is lower than that of the panel, funnel glass must have a higher X-ray absorption coefficient $\mu$. In conventional funnel glasses, $\mu$ as a value of $\geq 60$ cm$^{-1}$ at 0.06 nm. This high value is usually achieved by high PbO concentrations in the glass.

The requirements placed upon neck glass are very similar to those placed upon funnel glass. As the neck wall is even thinner than the funnel wall, neck glass must have an even higher X-ray absorption coefficient $\mu$: in conventional neck glasses, it is $\mu \geq 90$ cm$^{-1}$ (at 0.06 nm). Conventional prior art neck glasses likewise have a very high lead content.

Since the glass component PbO has recently come under public discussion as an environmental pollutant, manufacturers of devices containing cathode-ray tubes also have a need for PbO-free glasses having the requited physical properties.

Attempts to reproduce the physical and glass-technological properties effected by PbO by simple replacement of lead oxide by one or more constituents are generally unsuccessful. Instead, new developments in glass composition are necessary.

The patent literature already contains various documents, which describe glasses for cathode-ray tubes. However, these glasses have a variety of disadvantages:

JP 7-206468 A and JP 7-206471 A describe funnel glasses and neck glasses, respectively, for cathode-ray tubes which have a high $Bi_2O_3$ content and contain PbO at least as an optional component.

JP 9-142873 describes glasses for cathode ray tubes, which, in addition to a similar $Bi_2O_3$ content, contain $CeO_2$ to prevent discoloration of the glass caused by the electron radiation.

SUMMARY OF THE INVENTION

It is an object of the invention to provide glasses which meet the above-mentioned requirements and which, in particular, have the necessary X-ray absorption. It is an object of the invention to provide glasses, which are suitable for use as funnel glasses.

It is another object of the invention to provide glasses, which are suitable for use as neck glasses.

It is an additional object of the invention to provide glasses which meet the requirements placed upon soldering glasses, i.e. which have a low melting temperature, good wettability, flowability and which seal in a gas-tight manner.

These objects and others, which will be made more apparent hereinafter, are attained by the glasses according to the invention.

According to one aspect of the present invention the lead-free bismuth-containing silicate glass has the following composition (in percent by weight, based on oxide content):

| | |
|---|---|
| $SiO_2$ | 40 to 60 |
| $Bi_2O_3$ | 10 to 30 |
| $ZrO_2$ | 0 to 3 |
| $Al_2O_3$ | 0.5 to 5 |
| MgO | 0 to 6 |
| CaO | 0.5 to 6 |
| SrO | 1 to 15 |
| BaO | 0 to 15 |
| total alkaline earth metal oxide content | 2 to 20 |
| ZnO | 0 to 2 |
| $Li_2O$ | 0 to 10 |
| $Na_2O$ | 1 to 10 |
| $K_2O$ | 2 to 10 |
| $Cs_2O$ | 0 to 3 |
| total alkali metal oxide content | 5 to 20 |
| $CeO_2$ | 0 to 8 |
| $WO_3$ | 0.5 to 5 |
| $MoO_3$ | 0 to 5 |
| $Sb_2O_3$ | 0 to 0.6 |

According to another aspect of the present invention the lead-free bismuth-containing silicate glass has the following composition (in percent by weight, based on oxide content):

| | |
|---|---|
| $SiO_2$ | 30 to 50 |
| $Bi_2O_3$ | 20 to 40 |
| $ZrO_2$ | 0 to 5 |
| $Al_2O_3$ | 0.5 to 5 |
| MgO | 0 to 4 |
| CaO | 0.5 to 4 |
| SrO | 1 to 15 |
| BaO | 0 to 15 |
| total alkaline earth metal oxide content | 2 to 20 |
| ZnO | 0 to 2 |
| $Li_2O$ | 0 to 5 |
| $Na_2O$ | 1 to 12 |
| $K_2O$ | 2 to 15 |
| $Cs_2O$ | 0 to 3 |
| total alkali metal oxide content | 5 to 20 |
| $CeO_2$ | 0 to 8 |
| $WO_3$ | 0.5 to 5 |
| $MoO_3$ | 0 to 5 |
| $Sb_2O_3$ | 0 to 0.6 |

Starting out from the composition ranges known from the above-mentioned documents, a glass was developed which, in addition to $Bi_2O_3$, contains $WO_3$ as highly X-ray-absorbent component.

The minimum $WO_3$ content is 0.5% by weight to achieve a sufficient effect. The maximum content is 5% by weight. In particular at high $Bi_2O_3$ content, higher levels would lead to crystalline precipitates and the glass would no longer be flowable.

The X-ray-absorbent ingredients of the glass are $Bi_2O_3$, which is present at levels between 10 and 30% by weight, preferably 15–30% by weight, and, in the highly X-ray-absorbent embodiments, between 20 and 40% by weight, and SrO, which is present at levels between 1 and 15% by weight, and, in the highly X-ray-absorbent embodiments, preferably between 1 and 10% by weight. Higher SrO content would lead to strontium silicate formation, and higher $Bi_2O_3$ content would result in precipitation of metallic bismuth.

Since the main part of the X-ray absorption is caused by three different elements, the glass is stabilized in its amorphous structure and exhibits high crystallization stability and an increased glass formation range.

The $SiO_2$ content of the glass is at least 40% by weight and at most 60% by weight and for the highly X-ray-absorbent embodiments at least 30% by weight and at most 50% by weight. These maximum contents ensure good meltability and pressability. $SiO_2$ serves primarily as a network former; at a content lower than the minimum content glass formation is reduced to such an extent that glasses are no longer obtained, and the chemical resistance of the glass would be reduced.

The glass contains 0.5 to 5% by weight of $Al_2O_3$. $Al_2O_3$ enhances the chemical resistance and the crystallization stability in the stated composition range. At lower contents the effects are too small, at higher contents the viscosity of the glass and the softening point are increased excessively, impairing the melting and processing properties of the glass.

The alkali metal oxides $Na_2O$ (1 to 10% by weight or, for the highly X-ray-absorbent embodiments, 1 to 12% by weight, preferably 1 to 10% by weight) and $K_2O$ (2 to 10% by weight or, for the highly X-ray-absorbent embodiments, 2 to 15% by weight) serve as fluxing agents and reduce the viscosity of the glass. Below the stated lower limits, the reduction in viscosity is insufficient, whereas above the stated upper limits, not only the viscosity, but also the electrical resistance is excessively reduced. In the relatively weakly X-ray-absorbent embodiments ($\mu < 90$ cm$^{-1}$ at 0.06 nm), the glass can furthermore contain up to 10% by weight of $Li_2O$, preferably up to 5% by weight, and for the relatively highly X-ray-absorbent embodiments up to 5% by weight of $Li_2O$, and up to 3% by weight of $Cs_2O$.

The sum of the alkali metal oxides is between 5 and 20% by weight.

In addition to the alkaline earth metal oxide SrO, the glass also contains CaO in an amount from 0.5 to 4% by weight, and for the relatively weakly X-ray-absorbent embodiments up to 6% by weight. CaO decreases the melting temperature and increases the electrical resistance. At higher levels, the melting temperature increases excessively, and the viscosity profile as a function of the temperature is too steep, rendering the glass difficult to melt. Futhermore, the devitrification tendency increases and the flowability is restricted.

The same applies to MgO, which can be present in the glass in an amount of up to 4% by weight, and in the relatively weakly X-ray-absorbent embodiments in an amount of up to 6% by weight, and which is preferably present in an amount of at least 0.5% by weight. Partial replacement of CaO by MgO increases the devitrification stability.

The glass can furthermore contain up to 15% by weight of BaO, as X-ray-absorbent ingredient, like SrO. For the relatively highly X-ray-absorbent embodiments, up to 10% by weight of BaO are preferred. Higher contents would increase the liquidus temperature and thus the crystallization tendency.

The sum of the alkaline earth metal oxides should be between 2 and 20% by weight. For the relatively weakly X-ray-absorbent embodiments, 2 to 15% by weight are preferred.

The glass can furthermore contain conventional refining agents in the usual amounts. In particular, the glass can contain up to 0.6% by weight of is $Sb_2O_3$.

The glass can contain up to 3% by weight of $ZrO_2$. It is preferably $ZrO_2$-free. The glass can contain up to 2% by weight of ZnO. It is preferably ZnO-free.

The glass can furthermore contain up to 5% by weight Of $MoO_3$ and up to 8% by weight of $CeO_2$. These components do not only act as refining agents, but also facilitate glass formation and increase X-ray absorption. These components are therefore preferably present in the glass. The glass preferably contains at least 0.2% by weight of $MoO_3$ and at least 0.5% by weight of $CeO_2$.

WORKING EXAMPLES

Twenty-three glasses were melted at 1200 to 1400° C. in ceramic crucibles from conventional raw materials in a gas oven under oxidizing conditions. The melts were refined for one hour at 1300 to 1400° C. and then cast as blocks.

Tables 1 and 2 show the compositions of these glasses (in % by weight, based on oxide) and their most important properties. The following properties are given:

the coefficient of thermal expansion $\alpha_{20/300}[10^{-6}/K]$ the transition temperature Tg [° C.]

the density $\rho$ [g/cm$^3$]

the X-ray absorption coefficient $\mu$ [cm$^{-1}$] at 0.06 nm.

Table 1 contains glasses having a relatively low X-ray absorption coefficient, while Table 2 presents glasses having a high X-ray absorption coefficient, i.e. $\mu$ (at 0.06 rim) $\geq 90$ cm$^{-1}$.

TABLE 1

Compositions (in % by weight, based on oxide) and essential properties of the glasses

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 49.0 | 48.5 | 49.3 | 48.8 | 48.5 | 49.8 | 48.4 | 43.6 | 48.0 | 49.6 | 51.0 | 44.5 |
| $Al_2O_3$ | 1.8 | 2.7 | 3.7 | 3.8 | 1.9 | 4.3 | 2.6 | 3.7 | 4.0 | 4.3 | 4.3 | 4.3 |
| $Li_2O$ |  |  |  |  |  | 1.4 | 4.8 |  |  |  |  | 10.0 |
| $Na_2O$ | 5.1 | 5.0 | 5.9 | 4.3 | 4.3 | 3.4 | 1.0 | 5.7 | 5.8 | 5.9 | 7.0 | 6.7 |
| $K_2O$ | 7.6 | 7.4 | 8.4 | 7.6 | 7.7 | 4.7 | 8.5 | 6.8 | 6.9 | 6.9 | 6.4 |  |
| $Cs_2O$ |  | 2.0 |  | 1.0 |  |  |  | 1.5 | 1.0 |  |  |  |
| MgO | 1.6 | 1.6 | 2.2 | 1.1 | 1.6 | 0.9 | 0.5 | 1.9 | 1.5 | 1.9 | 0.4 | 0.5 |
| CaO | 4.1 | 4.1 | 3.8 | 2.9 | 3.8 | 1.3 | 2.3 | 0.7 | 0.8 | 2.1 | 2.1 | 2.8 |
| BaO | 5.0 | 2.9 |  | 1.0 | 1.0 | 1.4 | 1.4 | 3.0 | 2.5 | 3.0 | 1.3 |  |
| SrO | 2.4 | 2.0 | 1.0 | 1.0 | 4.8 | 1.4 | 1.4 | 2.5 | 1.7 | 2.1 |  |  |
| ZnO |  |  |  |  |  | 1.4 |  |  |  |  |  |  |

TABLE 1-continued

Compositions (in % by weight, based on oxide) and essential properties of the glasses

| | 1 | 2 | 3 | 4 | 5 | 6 | 7 | 8 | 9 | 10 | 11 | 12 |
|---|---|---|---|---|---|---|---|---|---|---|---|---|
| $ZrO_2$ | | | | 0.5 | | | | | | | | |
| $Bi_2O_3$ | 19.0 | 20.9 | 23.3 | 26.6 | 20.0 | 26.0 | 23.0 | 20.9 | 19.8 | 20.5 | 26.0 | 28.3 |
| $WO_3$ | 3.0 | 1.0 | 1.0 | 0.5 | 4.3 | 0.5 | 0.5 | 3.6 | 2.8 | 3.7 | 1.6 | 3.0 |
| $CeO_2$ | 1.0 | 1.0 | 1.0 | 0.5 | 1.4 | 4.6 | 0.5 | 3.5 | 3.1 | | | |
| $MoO_3$ | 0.5 | 0.5 | 0.5 | 0.5 | 0.6 | 0.3 | 3.8 | 2.7 | 2.1 | | | |
| $Sb_2O_3$ | | 0.5 | | | | | | | | | | |
| $\alpha_{20/300}$ [$10^{-6}$/K] | 9.22 | 9.18 | 9.68 | 9.5 | 8.18 | 8.66 | 9.42 | 9.95 | 9.98 | 9.97 | 9.97 | 10.05 |
| Tg (° C.) | 528 | 535 | 494 | 505 | 532 | 473 | 450 | 470 | 470 | 479 | 474 | 481 |
| ρ [g/cm$^3$] | 3.121 | 3.117 | 3.033 | 3.14 | 3.103 | 3.183 | 3.053 | 3.198 | 3.103 | 3.01 | 3.13 | 3.197 |
| μ [cm$^{-1}$] at 0.06 nm | 65.5 | 66 | 64.5 | 72.55 | 71.07 | 75.85 | 70.59 | 78 | 68 | 65.6 | 70 | 75 |

TABLE 2

Compositions (in % by weight, based on oxide) and essential properties of the glasses

| | 13 | 14 | 15 | 16 | 17 | 18 | 19 | 20 | 21 | 22 | 23 |
|---|---|---|---|---|---|---|---|---|---|---|---|
| $SiO_2$ | 45.2 | 45.2 | 46.7 | 43.9 | 44.7 | 42.1 | 41.9 | 44.0 | 38.0 | 45.4 | 42.7 |
| $Al_2O_3$ | 2.5 | 2.6 | 0.6 | 2.4 | 4.3 | 4.2 | 2.6 | 4.2 | 2.0 | 3.8 | 4.3 |
| $Li_2O$ | | | | | | | | 0.4 | | 4.3 | |
| $Na_2O$ | 1.5 | 2.1 | 1.8 | 9.3 | 3.4 | 3.3 | 2.0 | 4.4 | 5.0 | 7.6 | 10.0 |
| $K_2O$ | 10.5 | 10.1 | 9.3 | 3.5 | 4.7 | 4.6 | 13.7 | 4.6 | 8.0 | 1.1 | 3.0 |
| $Cs_2O$ | | | 0.9 | | | 1.5 | | | | | |
| MgO | | | | | 0.9 | 0.9 | | 0.9 | 1.0 | 2.9 | |
| CaO | 2.1 | 2.1 | 1.1 | 0.7 | 2.3 | 1.3 | 2.1 | 1.3 | 2.0 | 2.0 | 1.0 |
| BaO | | | 1.6 | 0.9 | 1.4 | 11.8 | | 1.4 | 2.0 | | 4.0 |
| SrO | 1.0 | 1.0 | 0.9 | 1.8 | 8.9 | 1.4 | 1.0 | 1.4 | 2.0 | | 5.0 |
| ZnO | | | | 0.5 | | | | | | | |
| $ZrO_2$ | | | 1.2 | | | | | | | | |
| $Bi_2O_3$ | 34.3 | 33.9 | 31.3 | 32.1 | 25.8 | 25.4 | 33.1 | 28.4 | 36.0 | 32.0 | 28.0 |
| $WO_3$ | 0.5 | 2.0 | 2.8 | 1.8 | 1.0 | 0.5 | 1.9 | 0.8 | 1.0 | 1.0 | 2.0 |
| $CeO_2$ | 1.4 | 0.5 | 0.9 | 1.3 | 2.4 | 1.9 | 0.5 | 7.6 | 2.0 | | |
| $MoO_3$ | 1.0 | 0.5 | 0.5 | 1.8 | 1.3 | 1.2 | 1.5 | 0.6 | 1.0 | | |
| $Sb_2O_3$ | | | 0.4 | | | | | | | | |
| $\alpha_{20/300}$ [$10^{-6}$/K] | 9.59 | 9.87 | 10.64 | 10.81 | 8.87 | 9.22 | 11.29 | 9.09 | 11.28 | 9.27 | 11.5 |
| Tg [° C.] | 515 | 496 | 520 | 461 | 552 | 526 | 491 | 500 | 477 | 508 | 489 |
| ρ [g/cm$^3$] | 3.302 | 3.334 | 3.358 | 3.387 | 3.336 | 3.451 | 3.272 | 3.397 | 3.477 | 3.288 | 3.38 |
| μ [cm$^{-1}$] at 0.06 nm | 94.55 | 96.06 | 97.85 | 98.46 | 92.82 | 91.6 | 95.23 | 90.27 | 110.61 | 90.7 | 91 |

The glasses according to the invention have the following advantageous properties:

Because of their coefficients of thermal expansion, the glasses are suitable for stress-free fusing or soldering with neck and panel glasses or with funnel glasses.

They have good melting and processing properties.

They have sufficient crystallization stability.

They have sufficient chemical resistance.

The have a sufficiently high electrical resistance.

Particularly, because of their low transition temperature and their good flowability, the glasses are highly suitable for use as soldering glass. For the purposes of the invention, soldering glass means both glass than can be used as solder and glass that forms the solder base glass for a composite solder in combination with ceramic additives.

They have a high X-ray absorption as indicated by an X-ray absorption coefficient μ of more than 60 cm$^{-1}$ at 0.06 nm.

Because of this X-ray absorption behavior and the stated properties, the glasses are highly suitable for use as funnel glass for cathode ray tubes.

The glasses having a high $Bi_2O_3$ content and a relatively low $SiO_2$ content have a particularly high X-ray absorption as indicated by an X-ray absorption coefficient μ of ≧90 cm$^{-1}$ at 0.06 nm, preferably even more than 95 cm$^{-1}$.

Because of this and the stated properties, the glasses are particularly suitable for use as neck glass for cathode-ray tubes.

The term "total alkaline earth metal oxide content" in the following claims means the sum of percentages by weight of all the individual alkaline earth oxides present. The term "total alkali metal oxide content" means the sum of the percentages by weight of all the individual alkali metal oxides present.

The disclosures in German Patent Applications DE 100 15 900.1-45 of Mar. 20, 2000, DE 100 29 818.4-45 of Jun. 16, 2000 and DE 100 29 820.6-45 of Jun. 16, 2000 are incorporated here by reference. These German Patent Applications describe the invention described hereinabove and claimed in the claims appended hereinbelow and provide the basis for a claim of priority for the instant invention under 35 U.S.C. 119.

While the invention has been illustrated and described as embodied in lead-free bismuth-containing silicate glasses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A lead-free bismuth-containing silicate glass consisting of, in percent by weight based on oxide content:

| | |
|---|---|
| $SiO_2$ | 40 to 60 |
| $Bi_2O_3$ | 10 to 30 |
| $ZrO_2$ | 0 to 3 |
| $Al_2O_3$ | 0.5 to 5 |
| MgO | 0 to 6 |
| CaO | 0.5 to 6 |
| SrO | 1 to 15 |
| BaO | 0 to 15 |
| total alkaline earth metal oxide content | 2 to 20 |
| ZnO | 0 to 2 |
| $Li_2O$ | 0 to 10 |
| $Na_2O$ | 1 to 10 |
| $K_2O$ | 2 to 10 |
| $Cs_2O$ | 0 to 3 |
| total alkali metal oxide content | 5 to 20 |
| $CeO_2$ | 0 to 8 |
| $WO_3$ | 0.5 to 5 |
| $MoO_3$ | 0 to 5 |
| $Sb_2O_3$ | 0 to 0.6. |

2. The silicate glass as defined in claim 1, containing at least 0.2% by weight of said $MoO_3$.

3. The silicate glass as defined in claim 1, containing at least 0.5% by weight of said $CeO_2$.

4. The silicate glass as defined in claim 1, containing at least 0.2% by weight of said $MoO_3$ and at least 0.5% by weight of said $CeO_2$.

5. The silicate glass as defined in claim 1, containing from 15 to 30% by weight of said $Bi_2O_3$, 0% by weight said $ZrO_2$, from 0.5 to 6% by weight of said MgO, from 1 to 15% by weight of said BaO, 0% by weight ZnO, from 0 to 5% by weight $Li_2O$, from 0.5 to 8% by weight $CeO_2$ and from 0.2 to 5 % by weight $MoO_3$ and wherein said total content of said alkaline earth metal oxides is from 2 to 15% by weight.

6. The silicate glass as defined in claim 1, having an X-ray absorption coefficient $\mu$ of more than 60 cm$^{-1}$ at 0.06 nm.

7. A funnel glass for a cathode ray tube comprising a lead-free bismuth-containing silicate glass having the following composition, in percent by weight, based on oxide:

| | |
|---|---|
| $SiO_2$ | 40 to 60 |
| $Bi_2O_3$ | 10 to 30 |
| $ZrO_2$ | 0 to 3 |
| $Al_2O_3$ | 0.5 to 5 |
| MgO | 0 to 6 |
| CaO | 0.5 to 6 |
| SrO | 1 to 15 |
| BaO | 0 to 15 |
| total alkaline earth metal oxide content | 2 to 20 |
| ZnO | 0 to 2 |
| $Li_2O$ | 0 to 10 |
| $Na_2O$ | 1 to 10 |
| $K_2O$ | 2 to 10 |
| $Cs_2O$ | 0 to 3 |
| total alkali metal oxide content | 5 to 20 |
| $CeO_2$ | 0 to 8 |
| $WO_3$ | 0.5 to 5 |
| $MoO_3$ | 0 to 5 |
| $Sb_2O_3$ | 0 to 0.6 | and having an X-ray absorption coefficient $\mu$ of more than 60 cm$^{-1}$ at 0.06 nm.

8. A lead-free bismuth-containing soldering glass having a composition, in percent by weight, based on oxide content, consisting of:

| | |
|---|---|
| $SiO_2$ | 40 to 60 |
| $Bi_2O_3$ | 10 to 30 |
| $ZrO_2$ | 0 to 3 |
| $Al_2O_3$ | 0.5 to 5 |
| MgO | 0 to 6 |
| CaO | 0.5 to 6 |
| SrO | 1 to 15 |
| BaO | 0 to 15 |
| total alkaline earth metal oxide content | 2 to 20 |
| ZnO | 0 to 2 |
| $Li_2O$ | 0 to 10 |
| $Na_2O$ | 1 to 10 |
| $K_2O$ | 2 to 10 |
| $Cs_2O$ | 0 to 3 |
| total alkali metal oxide content | 5 to 20 |
| $CeO_2$ | 0 to 8 |
| $WO_3$ | 0.5 to 5 |
| $MoO_3$ | 0 to 5 |
| $Sb_2O_3$ | 0 to 0.6. |

9. A lead-free bismuth-containing silicate glass consisting of, in percent by weight based on oxide content:

| | |
|---|---|
| $SiO_2$ | 30 to 50 |
| $Bi_2O_3$ | 20 to 40 |
| $ZrO_2$ | 0 to 3 |
| $Al_2O_3$ | 0.5 to 5 |
| MgO | 0 to 4 |
| CaO | 0.5 to 4 |
| SrO | 1 to 15 |
| BaO | 0 to 15 |
| total alkaline earth metal oxide content | 2 to 20 |
| ZnO | 0 to 2 |
| $Li_2O$ | 0 to 5 |
| $Na_2O$ | 1 to 12 |
| $K_2O$ | 2 to 15 |
| $Cs_2O$ | 0 to 3 |
| total alkali metal oxide content | 5 to 20 |
| $CeO_2$ | 0 to 8 |
| $WO_3$ | 0.5 to 5 |
| $MoO_3$ | 0 to 5 |
| $Sb_2O_3$ | 0 to 0.6. |

10. The silicate glass as defined in claim 9, containing at least 0.2% by weight of said $MoO_3$.

11. The silicate glass as defined in claim 9, containing at least 0.5% by weight of said $CeO_2$.

12. The silicate glass as defined in claim 9, containing at least 0.2% by weight of said $MoO_3$ and at least 0.5% by weight of said $CeO_2$.

13. The silicate glass as defined in claim 9, containing 0% by weight said $ZrO_2$, from 0.5 to 4% by weight of said MgO, from 1 to 10% by weight of said SrO, from 1 to 12% by weight of said BaO, 0% by weight ZnO, from 1 to 10% by weight $Na_2O$, from 0.5 to 8% by weight $CeO_2$ and from 0.2 to 5% by weight $MoO_3$ and having a total content of alkaline earth metal oxides of 2 to 15% by weight.

14. The silicate glass as defined in claim 9, having an X-ray absorption coefficient $\mu$ of more than 60 cm$^{-1}$ at 0.06 nm.

15. A funnel glass for a cathode ray tube comprising a lead-free bismuth-containing silicate glass having the following composition, in percent by weight, based on oxide:

| | |
|---|---|
| SiO$_2$ | 30 to 50 |
| Bi$_2$O$_3$ | 20 to 40 |
| ZrO$_2$ | 0 to 3 |
| Al$_2$O$_3$ | 0.5 to 5 |
| MgO | 0 to 4 |
| CaO | 0.5 to 4 |
| SrO | 1 to 15 |
| BaO | 0 to 15 |
| total alkaline earth metal oxide content | 2 to 20 |
| ZnO | 0 to 2 |
| Li$_2$O | 0 to 5 |
| Na$_2$O | 1 to 12 |
| K$_2$O | 2 to 15 |
| Cs$_2$O | 0 to 3 |
| total alkali metal oxide content | 5 to 20 |
| CeO$_2$ | 0 to 8 |
| WO$_3$ | 0.5 to 5 |
| MoO$_3$ | 0 to 5 |
| Sb$_2$O$_3$ | 0 to 0.6 | and having an X-ray absorption coefficient $\mu$ of more than 60 cm$^{-1}$ at 0.06 nm.

16. A lead-free bismuth-containing soldering glass having a composition, in percent by weight, based on oxide content, consisting of:

| | |
|---|---|
| SiO$_2$ | 30 to 50 |
| Bi$_2$O$_3$ | 20 to 40 |
| ZrO$_2$ | 0 to 3 |
| Al$_2$O$_3$ | 0.5 to 5 |
| MgO | 0 to 4 |
| CaO | 0.5 to 4 |
| SrO | 1 to 15 |
| BaO | 0 to 15 |
| total alkaline earth metal oxide content | 2 to 20 |
| ZnO | 0 to 2 |
| Li$_2$O | 0 to 5 |
| Na$_2$O | 1 to 12 |
| K$_2$O | 2 to 15 |
| Cs$_2$O | 0 to 3 |
| total alkali metal oxide content | 5 to 20 |
| CeO$_2$ | 0 to 8 |
| WO$_3$ | 0.5 to 5 |
| MoO$_3$ | 0 to 5 |
| Sb$_2$O$_3$ | 0 to 0.6. |

17. A lead-free bismuth-containing neck glass for a cathode ray tube having a composition, in percent by weight, based on oxide content, consisting of:

| | |
|---|---|
| SiO$_2$ | 30 to 50 |
| Bi$_2$O$_3$ | 20 to 40 |
| ZrO$_2$ | 0 to 3 |
| Al$_2$O$_3$ | 0.5 to 5 |
| MgO | 0 to 4 |
| CaO | 0.5 to 4 |
| SrO | 1 to 15 |
| BaO | 0 to 15 |
| total alkaline earth metal oxide content | 2 to 20 |
| ZnO | 0 to 2 |
| Li$_2$O | 0 to 5 |
| Na$_2$O | 1 to 12 |
| K$_2$O | 2 to 15 |
| Cs$_2$O | 0 to 3 |
| total alkali metal oxide content | 5 to 20 |
| CeO$_2$ | 0 to 8 |
| WO$_3$ | 0.5 to 5 |
| MoO$_3$ | 0 to 5 |
| Sb$_2$O$_3$ | 0 to 0.6 | and having an X-ray absorption coefficient $\mu$ of more than 90 cm$^{-1}$ at 0.06 nm.

* * * * *